Feb. 3, 1948. A. F. KOCH 2,435,396
CENTERING RING FOR ADJUSTABLE TOOLHOLDERS
Filed Dec. 4, 1944 2 Sheets-Sheet 1

Inventor

Alfred Fred Koch

By Clarence A. O'Brien
and Harvey B. Jacobson
Attorneys

Feb. 3, 1948. A. F. KOCH 2,435,396
CENTERING RING FOR ADJUSTABLE TOOLHOLDERS
Filed Dec. 4, 1944 2 Sheets-Sheet 2

Inventor
Alfred Fred Koch

By Clarence A. O'Brien
and Harvey B. Jacobson
Attorneys

Patented Feb. 3, 1948

2,435,396

UNITED STATES PATENT OFFICE 2,435,396

CENTERING RING FOR ADJUSTABLE TOOLHOLDERS

Alfred Fred Koch, Cincinnati, Ohio

Application December 4, 1944, Serial No. 566,427

1 Claim. (Cl. 279—6)

The present invention relates to new and useful improvements in tool holders of a type adapted for use on turret lathes and the invention has for its primary object to provide means for easily and quickly adjusting the tool holder in the lathe to properly center the tool.

A further object of the invention is to provide an attachment of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
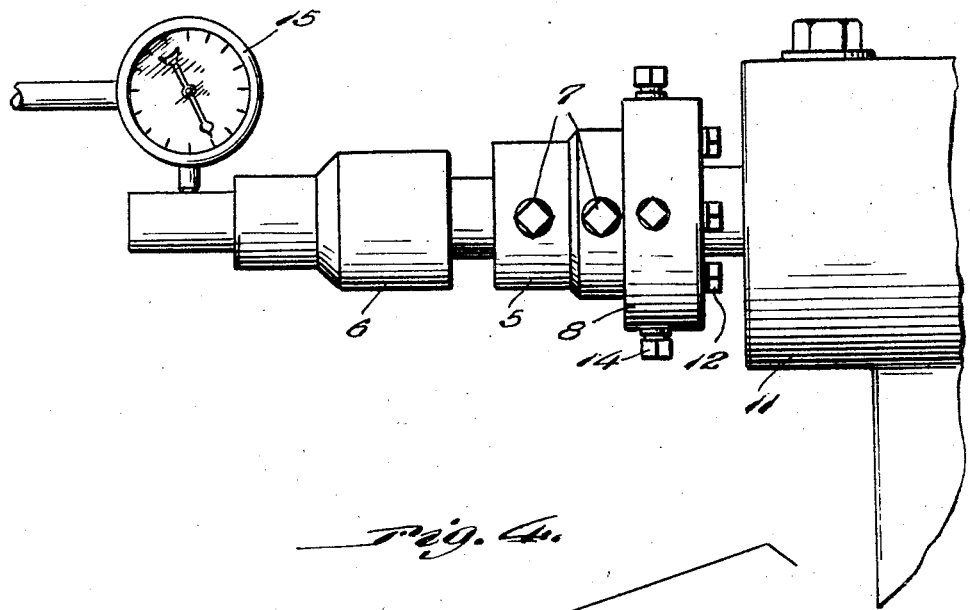
Figure 1 is a side elevational view of the tool holder and centering attachment shown in position attached to the lathe.
Figure 4:
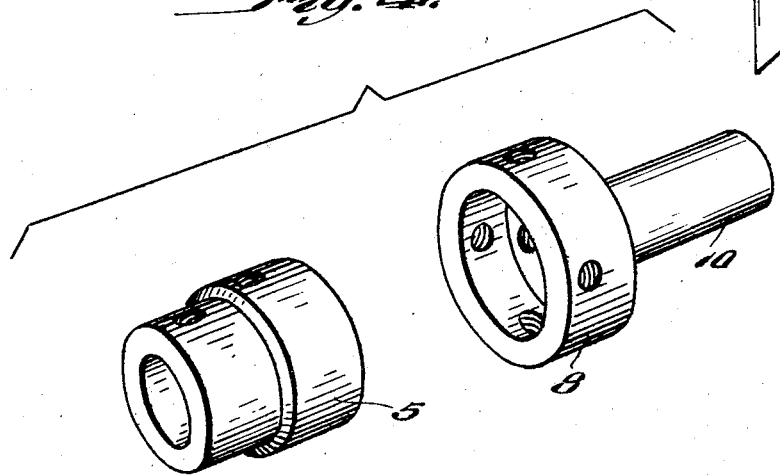
Figure 4 is a group perspective view of the tool holder and centering ring attachment.

Referring now to the drawings in detail wherein for the purpose of illustration I have disclosed a preferred embodiment of the invention, the numeral 5 designates a tool holder adapted for receiving a tool 6 secured in position in the holder by the set screws 7. One end of the tool holder is loosely inserted in a ring member 8 which is welded or otherwise secured on a flange 9 of a bushing 10 adapted for securing in the lathe 11 in any suitable manner.

The tool holder 5 is secured to the flange 9 by means of studs 12 freely inserted through openings 13 in the flange to permit adjustment of the tool holder relative to the flange.

Figure 2:
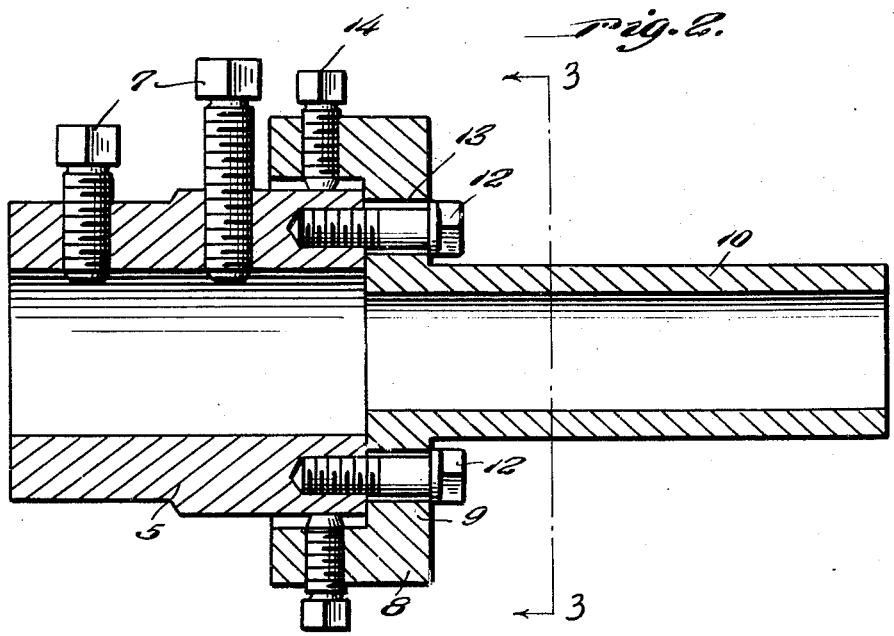
Figure 2 is a longitudinal sectional view through the tool holder and centering attachment.
Figure 3:
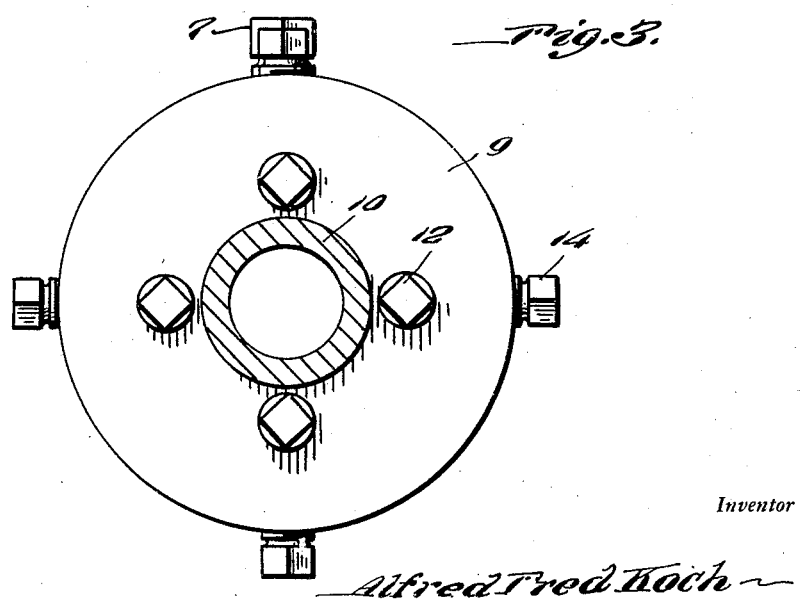
Figure 3 is a sectional view taken substantially on a line 3—3 of Figure 2.

The flange 9 is of a diameter greater than the tool holder 5 as shown to advantage in Figure 2 of the drawings and one edge of the ring 8 projects forwardly beyond the flange 9 to accommodate the tool holder 5, the tool holder being adjusted in the ring by means of the set screws 14 threaded through the ring and engaging the sides of the tool holder.

Accordingly, the tool holder may be centered in the ring 8 and with respect to the bushing in accordance with variations in the tool registered by the dial indicator 15.

It is believed that the details of construction and manner of use of the device will be readily understood from the foregoing without further detailed explanation.

Having thus described the invention, what I claim is:

A centering attachment for the tool holder of a lathe and comprising a bushing adapted for mounting in the lathe, a flange on the outer end of the bushing, a ring on the outer edge of the flange and adapted for freely receiving one end of the tool holder, studs freely inserted through the flange and engaging the tool holder and set screws carried by the ring for engaging the sides of the tool holder to center the tool holder in the ring.

ALFRED FRED KOCH.

REFERENCES CITED

The following references are of record in the file of this patent:

UNITED STATES PATENTS

| Number | Name | Date |
|---|---|---|
| 1,935,493 | Wellington | Nov. 14, 1933 |
| 2,162,246 | Cote | June 13, 1939 |

FOREIGN PATENTS

| Number | Country | Date |
|---|---|---|
| 447,590 | France | 1912 |